United States Patent
Kitamura (10) Patent No.: US 6,650,825 B1
(45) Date of Patent: Nov. 18, 2003

(54) MAGNETIC RECORDING AND REPRODUCING APPARATUS AND METHOD OF ADJUSTING THE HEAD-SWITCHING POINT THEREIN

(75) Inventor: Hisashige Kitamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,411

(22) Filed: Dec. 8, 1999

(30) Foreign Application Priority Data

Mar. 17, 1999 (JP) .......................... 11/071950

(51) Int. Cl.$^7$ ............................................... H04N 5/91
(52) U.S. Cl. ............................ 386/46; 386/78; 386/80
(58) Field of Search ........................... 386/13–14, 46, 386/78–80, 22, 54, 74; 360/23, 61, 64

(56) References Cited

U.S. PATENT DOCUMENTS

| 3,748,381 A | * | 7/1973 | Strobele et al. ............... 386/54 |
| 4,425,584 A | * | 1/1984 | Hirota et al. .................. 386/22 |
| 4,774,597 A | * | 9/1988 | Harvey ......................... 360/23 |
| 4,876,614 A | * | 10/1989 | Kaaden et al. ................ 386/74 |
| 4,914,531 A | | 4/1990 | Kaaden et al. |
| 5,357,382 A | | 10/1994 | Lee |
| 5,675,698 A | | 10/1997 | Choi |

FOREIGN PATENT DOCUMENTS

| JP | 60-150208 | 8/1985 |
| JP | 63-121159 | 5/1988 |
| JP | 541850 | 2/1993 |
| JP | 5-41850 | 2/1993 |
| JP | 8138283 | 5/1996 |

* cited by examiner

Primary Examiner—Thai Tran
Assistant Examiner—Christopher Onuaku
(74) Attorney, Agent, or Firm—Birch, Stewart, Kolasch & Birch, LLP.

(57) ABSTRACT

In a magnetic recording and reproducing apparatus with at least two video heads mounted on a rotating drum, a reference video signal is reproduced, using a stored initial value to control the head-switching point, the interval from the head-switching point to the reproduced vertical synchronizing pulse is measured, and a control value that sets the head-switching point a predetermined distance from the vertical synchronizing pulse is calculated. The calculated control value is stored and used when video signals are subsequently recorded. Different control values may be stored for use with different types of video signals, or the control value may be automatically converted according to the signal type.

16 Claims, 11 Drawing Sheets

MAGNETIC RECORDING AND REPRODUCING APPARATUS AND METHOD OF ADJUSTING THE HEAD-SWITCHING POINT THEREIN

BACKGROUND OF THE INVENTION

The present invention relates to a magnetic recording and reproducing apparatus having a pair of heads that are used alternately, more particularly to the adjustment of the timing of the switching from one head to another.

An example of this type of magnetic recording and reproducing apparatus is a video cassette recorder having two video heads mounted in a rotating drum so as to scan alternate helical tracks on a magnetic tape. One field of a video signal is recorded in each helical track. The switching between the two heads is controlled by a head-switching signal generated by a bi-stable circuit or flip-flop that changes state once per field. The head-switching must be timed to avoid the vertical synchronizing pulse interval, lest synchronization be disturbed by switching noise, leading to picture problems such as imperfect interlacing and jitter. For similar reasons, the head-switching point should not occur in the visible part of the picture. In video cassette recorders of the widely used VHS type, the head-switching point is positioned six and one-half horizontal scanning periods (6.5H) before the vertical synchronizing pulse.

Figure 1:
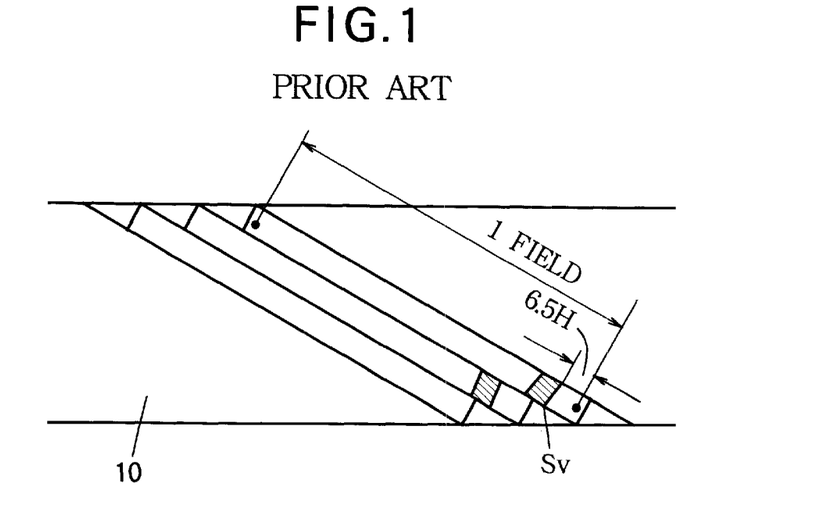
FIG. 1 illustrates head-switching points on a magnetic tape with helical tracks.
Figure 2:
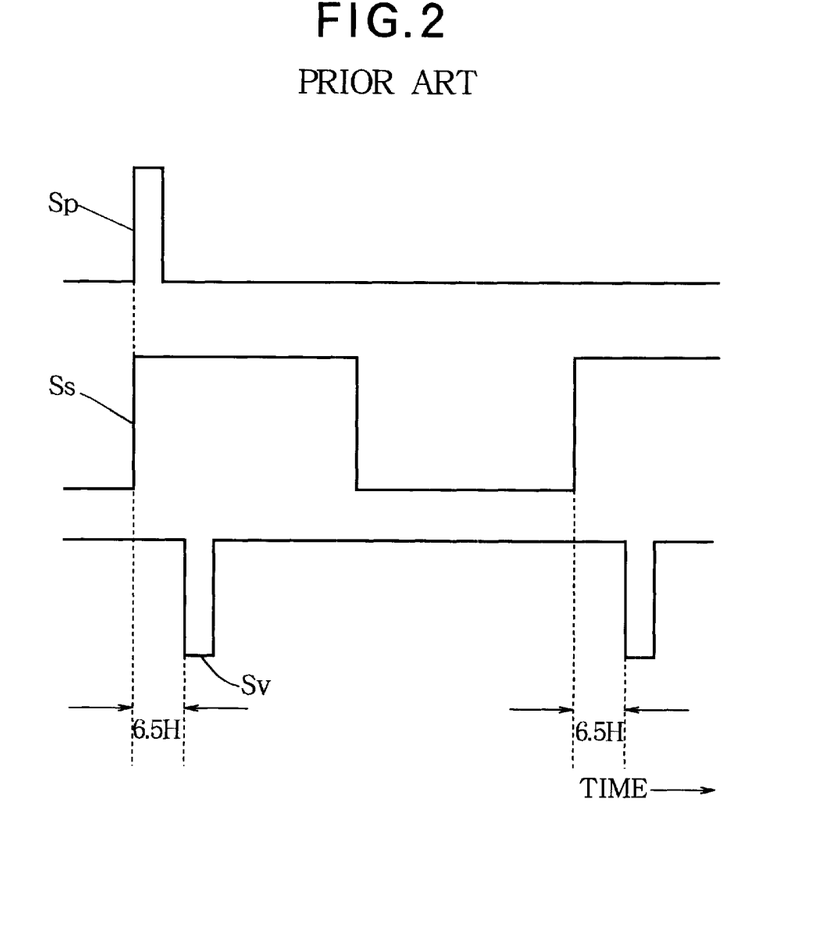
FIG. 2 shows waveforms of a sensor signal, a head-switching signal, and a vertical synchronizing signal.

This positioning is illustrated in FIG. 1, which shows three adjacent helical tracks on a magnetic tape 10. Sv denotes the vertical synchronizing pulse interval. The switching points at the beginning and end of one track are indicated by black dots. FIG. 2 shows an example of the corresponding relationships among the vertical synchronizing pulse Sv, the head-switching signal Ss, and a sensor pulse Sp from which the head-switching signal Ss is generated.

Figure 3:
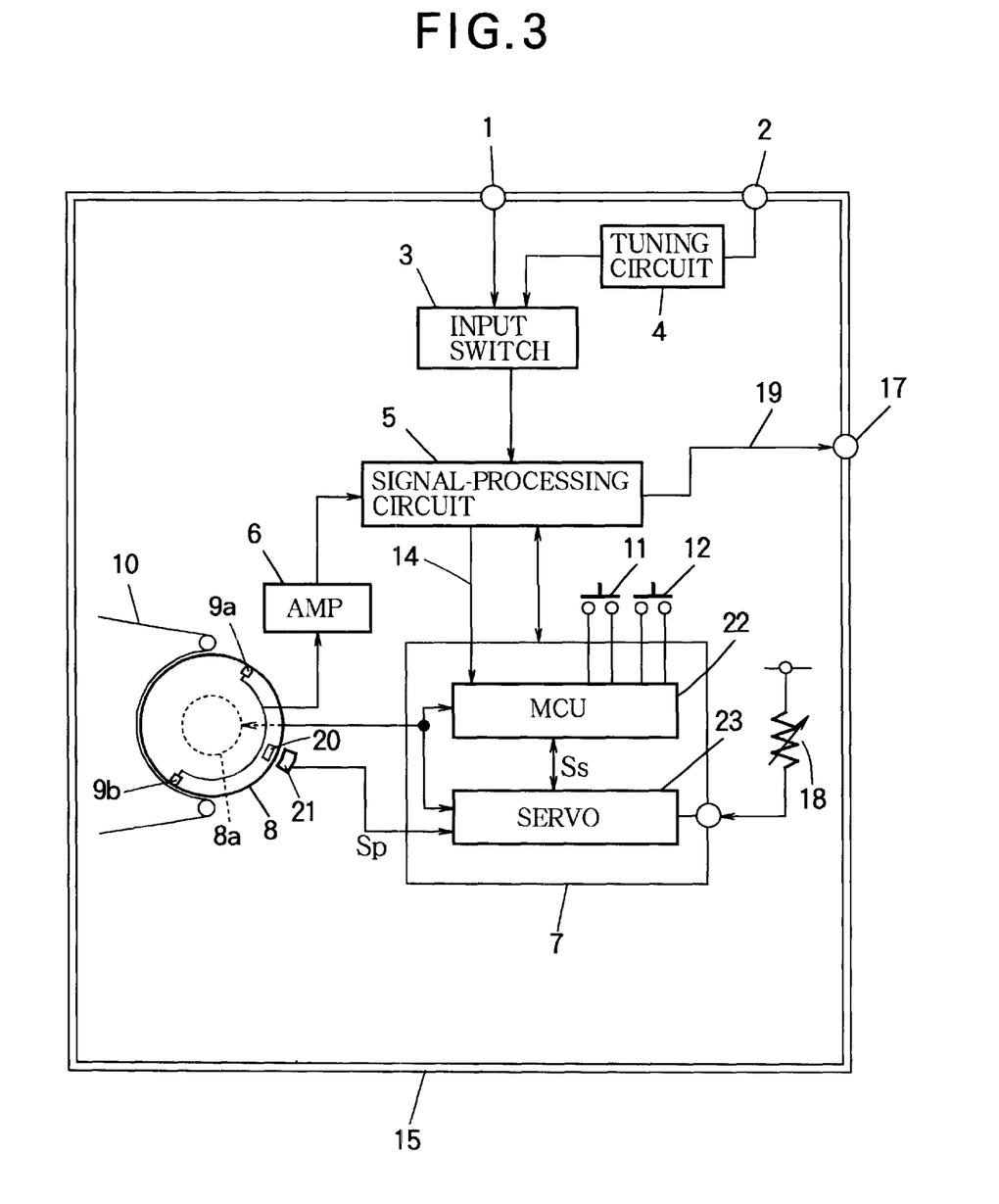
FIG. 3 is a block diagram illustrating the structure of a conventional video cassette recorder.

When a video cassette recorder is manufactured, the head-switching point must be adjusted so that it is correctly positioned on the magnetic tape. One conventional means of adjustment is an analog means, such as a monostable multivibrator with a variable resistor, that creates a variable delay from the rise of Sp to the rise of Ss in FIG. 2. FIG. 3 shows a conventional video cassette recorder in which this means is employed.

The video cassette recorder has an external input terminal 1 for a video signal received from other apparatus, an antenna input terminal 2 for input of a signal received from an antenna, an input switching device 3 selecting one of the two input terminals 1, 2, a tuning circuit 4 that converts the antenna signal to a video signal, a signal-processing circuit 5 that separates horizontal and vertical synchronizing signals from the video signal, an amplifier circuit (AMP) 6, and a control unit 7. The control unit 7 controls the rotation of a drum 8 by controlling a drum motor 8a. A pair of video heads 9a, 9b, mounted at diametrically opposite positions on the rotating drum 8, scan a magnetic tape 10, which wraps substantially halfway around the drum 8.

The video cassette recorder has a record button 11 and a play button 12. When the play button 12 is pressed and a picture is reproduced from the magnetic tape 10, the amplifier circuit 6 amplifies the signal picked up by the heads 9a, 9b and supplies the amplified signal to the signal-processing circuit 5. The signal-processing circuit 5 separates the vertical synchronizing signal 14 from the amplified signal, and supplies the vertical synchronizing signal 14 to the control unit 7.

The above components are enclosed within a housing 15, which has a video output terminal 17. Also disposed within the housing 15 is a variable resistor 18 for adjusting the head-switching timing. When a video signal is reproduced from the magnetic tape 10, the reproduced video signal 19 is supplied to the video output terminal 17.

The sensor pulse signal Sp is generated by a permanent magnet 20 mounted on the rotating drum 8 and a position-sensing head 21 that senses the magnetic field of the permanent magnet 20. The control unit 7 comprises a microelectronic computing device such as a microcontroller unit (MCU) 22, which receives the vertical synchronizing signal 14 and signals from the record button 11 and play button 12, and a servo circuit 23, which receives the sensor pulse signal Sp and generates the head-switching signal Ss. The servo circuit 23 uses the head-switching signal Ss in controlling the drum motor 8a. The microcontroller unit 22 uses the head-switching signal Ss to control the head-switching timing by controlling a switch (not visible) in the amplifier circuit 6 or signal-processing circuit 5. The switch is controlled so that, for example, video head 9a is selected when Ss is high, and video head 9b when Ss is low.

The servo circuit 23 includes a flip-flop (not visible) from which the head-switching signal Ss is output, and the above-mentioned monostable multivibrator (not visible), which sets the flip-flop after being triggered by the sensor pulse Sp. The delay from the triggering pulse Sp to the setting of the flip-flop is determined by the variable resistor 18. By setting the flip-flop, the Sp pulse generates the rising transition of the head-switching signal Ss. The servo circuit 23 resets the flip-flop so that the falling transitions of the head-switching signal Ss occur midway between the rising transitions.

The timing of the rising and falling transitions of the head-switching signal Ss requires adjustment to compensate for variations in the mounting positions of the permanent magnet 20 and position-sensing head 21, and variations in the shape of the magnetic field generated by the permanent magnet 20. When the head-switching timing is adjusted, a standard reference cassette is loaded into the video cassette recorder. The magnetic tape 10 in the reference cassette has a pre-recorded reference video signal with vertical synchronizing pulses located in the positions specified by the VHS standard. The person performing the adjustment connects an oscilloscope to test points enabling the head-switching signal Ss and vertical synchronization signal Sv to be monitored simultaneously, presses the play button 12, and adjusts the variable resistor 18 so that the rising and falling transitions of the head-switching signal Ss occur six and one-half horizontal scanning periods before the vertical synchronizing pulse Sv.

When the adjustment process described above is carried out on video-cassette-recorder production lines, it is time-consuming and inconvenient, because it requires the connection of an oscilloscope and manual adjustment of the variable resistor 18. This adds to the cost of the video cassette recorder. Like analog adjustments in general, the adjustment is also inherently imprecise, being subject to human variability, temperature effects, and aging drift.

In a video cassette recorder designed to record and reproduce video signals conforming to different television broadcast standards, a further problem is that even if the switching point is adjusted accurately according to one standard, it may be inaccurate for another standard. For example, 6.5 horizontal scanning periods is equal to substantially four hundred thirteen microseconds in the NTSC standard, but to four hundred sixteen microseconds in the PAL standard. Incidentally, NTSC stands for National Television System Committee, and PAL for phase alternation by line.

As a partial solution to these problems, U.S. Pat. No. 4,914,531 describes a video recorder that, when reproducing a recorded video signal, automatically adjusts the head-switching point in relation to the vertical synchronization signal. This feature does not assure that the head-switching point will be accurately positioned when a video signal is recorded, however, so manual adjustment is also necessary.

Japanese Unexamined Patent Publication Nos. 60-150208 and 5-41850 describe magnetic recording and reproducing devices that adjust the head-switching point automatically and store the adjusted value in a memory. These features eliminate the need for manual adjustment, but fail to provide a suitable initial value, do not provide means of confirming the adjustment, and do not solve the problem of different adjustments being needed for different television standards.

SUMMARY OF THE INVENTION

It is accordingly an object of the present invention to simplify and shorten the head-switching adjustment of a magnetic recording and reproducing apparatus.

Another object of the invention is to provide means of confirming the adjustment.

Another object is to provide an accurately adjusted head-switching point when different types of signals are recorded and reproduced.

The invented method of adjusting the head-switching point of a magnetic recording and reproducing apparatus comprises the steps of:

storing an initial value in a memory device;

reproducing a reference video signal, using the initial value to control the head-switching point;

measuring the interval from the head-switching point to the reproduced vertical synchronizing pulse;

calculating a control value that sets the head-switching point a predetermined distance from the vertical synchronizing pulse; and storing the calculated control value in the memory device for subsequent use in recording video signals.

These steps may be carried out for an NTSC reference video signal, a PAL reference video signal, or both types of reference video signals. The invented method may also comprise one or more of the following steps:

automatically discriminating between NTSC and PAL reference videos signals;

automatically converting the control value between NTSC and PAL modes; and automatically converting the initial value between NTSC and PAL modes.

The invention also provides a magnetic recording and reproducing apparatus that employs the invented method of adjusting the head-switching point.

DETAILED DESCRIPTION OF THE INVENTION

Embodiments of the invention will be described with reference to the attached drawings, in which like parts are indicated by like reference characters. Horizontal scanning periods will be referred to simply as 'horizontal periods.'

The first embodiment is a video cassette recorder that records and reproduces signals according to the NTSC standard, in which six and one-half horizontal periods (6.5H) is equivalent to substantially four hundred thirteen microseconds (413 $\mu$s). The precise value of 6.5H depends on whether the NTSC signal is a monochrome signal with a frame rate of thirty hertz (30 Hz), or a color signal with a frame rate of 29.97 Hz, but the value is close to 413 $\mu$s in either case. Where 413 $\mu$s appears in the following description, it should be understood that a more precise value, such as 412.75 $\mu$s, for example, may be used instead. Similarly, 30 Hz may be replaced by, for example, 29.97 Hz.

Figure 4:
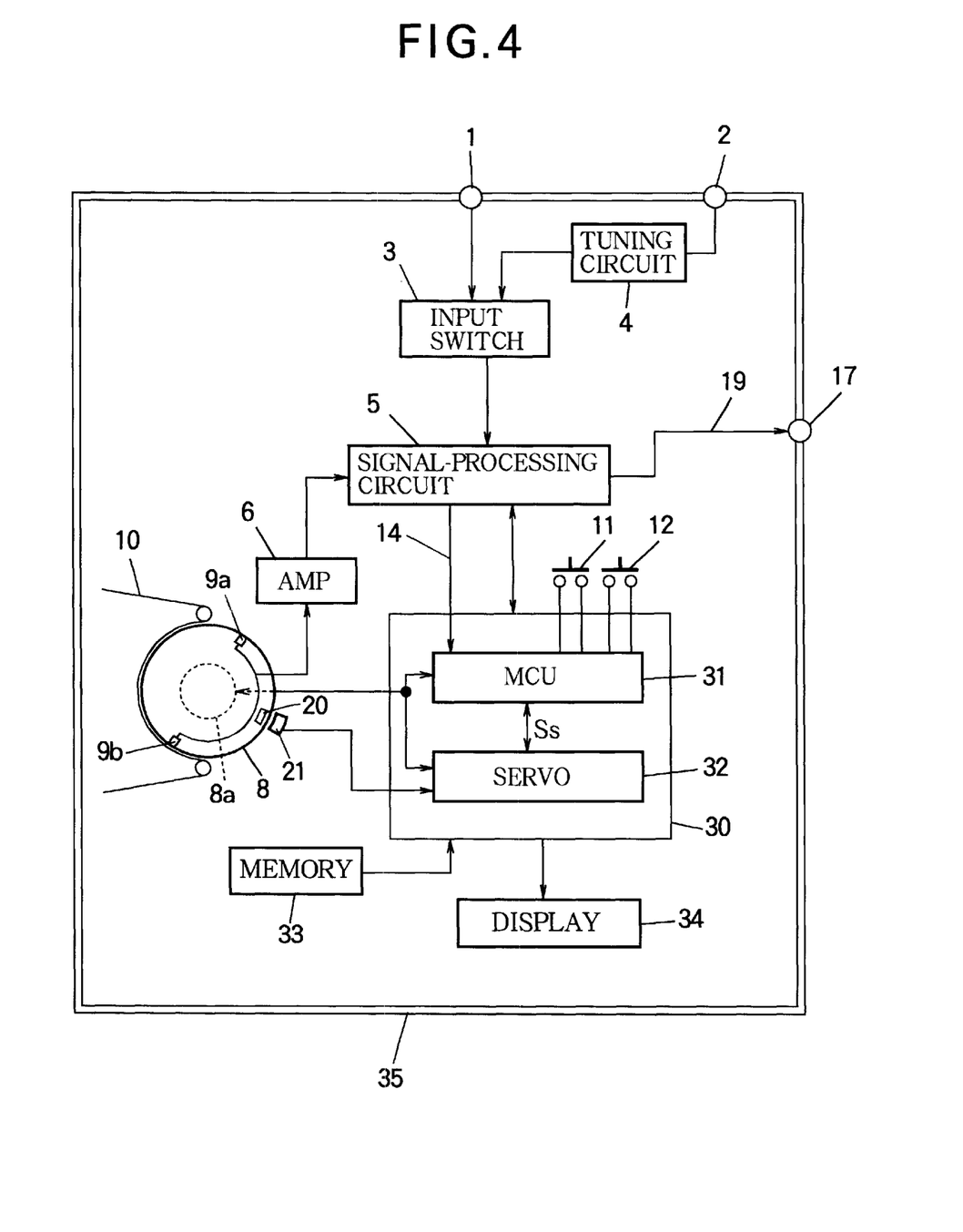
FIG. 4 is a block diagram of a video cassette recorder illustrating first and third embodiments of the invention.

Referring to FIG. 4, the first embodiment comprises an external input terminal 1, antenna input terminal 2, input switching device 3, tuning circuit 4, signal-processing circuit 5, amplifier circuit 6, rotating drum 8, drum motor 8a, video heads 9a, 9b, record button 11, play button 12, video output terminal 17, permanent magnet 20, and position-sensing head 21 that are similar to the corresponding elements in FIG. 3.

The first embodiment also has a control unit 30 comprising a control device such as a microcontroller unit (MCU) 31, and a servo circuit 32. The microcontroller unit 31 controls the overall operation of the video cassette recorder, including head-switching operations. The servo circuit 32 controls the drum motor 8a, and other motors (not visible) that transport the magnetic tape 10. The servo circuit 32 generates the head-switching signal Ss from the sensor pulse signal Sp. The delay from the rise of Sp to the rise of Ss is set by the microcontroller unit 31 according to a control value stored in a memory device 33. The control value determines the angular position of the heads 9a, 9b at the head-switching instant. The microcontroller unit 31 also displays information on a display unit 34, which is disposed together with the other components inside the housing 35 of the video cassette recorder. The display unit 34 comprises, for example, a liquid crystal display panel or seven-segment light-emitting diode display.

The microcontroller unit 31 comprises a memory storing a control program and data, a central processing unit that executes the control program, and a timer or counter for measuring time intervals. One function of the microcontroller unit 31 is to calculate the above-mentioned control value. The memory device 33, besides storing the control value, stores an initial value that is used before the control value is calculated. The memory device 33 is a non-volatile memory device such as an electrically erasable programmable read-only memory (EEPROM), or a memory device backed up by a battery so as to retain stored data when the video cassette recorder is switched off.

Next, the adjustment and subsequent operation of the video cassette recorder will be described.

In the adjustment mode, a reference cassette is loaded into the video cassette recorder, and the play button 12 is pressed to reproduce a reference video signal of the NTSC type, which is recorded according to VHS specifications in the reference cassette. The microcontroller unit 31 reads the initial value from the memory device 33, and sets this value in the servo circuit 32 to determine an initial delay between the sensor pulse signal Sp and head-switching signal Ss. The initial value is, for example, a nominal value that will produce an interval of 413 $\mu$s from the head-switching signal Ss to the vertical synchronizing pulse Sv for an ideal permanent magnet 20 mounted in the ideal position on the rotating drum 8.

As the drum 8 rotates, the servo circuit 32 compares the head-switching signal Ss with, for example, a 30-Hz reference signal obtained from an oscillator (not visible). The servo circuit 32 supplies the drum motor 8a with a control signal that adjusts the rotational phase of the drum 8 so as to lock the head-switching signal Ss in relation to the reference oscillator signal. The rotational frequency of the drum 8 is thereby locked at the NTSC frame rate of 30 Hz. The servo circuit 32 also controls the transport of the magnetic tape 10 in relation to the reference oscillator signal.

The video signal picked up by the heads 9a, 9b is amplified by the amplifier circuit 6, and the vertical synchronizing signal 14 is separated by the signal-processing circuit 5 and supplied to the microcontroller unit 31. The microcontroller unit 31 measures the interval from rising and falling transitions of the head-switching signal Ss to the synchronizing pulses Sv in the vertical synchronizing signal 14. Because of manufacturing tolerances, the measured interval will not in general be exactly equal to 413 $\mu$s, but it will be a nearby value, such as 400 $\mu$s. The microcontroller unit 31 calculates a control value that differs from the initial value by an amount corresponding to the difference between the measured interval and 413 $\mu$s, and stores the calculated control value in the memory device 33.

In subsequent operations, the microcontroller unit 31 reads the control value from the memory device 33, and sets the control value in the servo circuit 32 to determine the delay from the sensor pulse Sp to the rising transition of the head-switching signal Ss. The rising and falling Ss transitions now occur at the instants when the video heads 9a, 9b are in the correct head-switching positions. When a video signal is reproduced from a properly recorded cassette, the head-switching point is located 413 $\mu$s (6.5H) in front of the vertical synchronizing pulse Sv.

When the record button 11 is pressed to record a video signal on the magnetic tape 10, the servo circuit 32 compares the head-switching signal Ss with the vertical synchronizing signal 14 separated from the signal being recorded, and controls the rotational phase of the drum 8 so that the rising and falling transitions of the head-switching signal Ss occur just 413 $\mu$s (6.5H) before the vertical synchronizing pulses Sv. Because the position of the heads 9a, 9b at these transitions is determined by the control value, which has been calculated from measurements of an accurate reference video signal, the vertical synchronizing signal is recorded in the correct position on the magnetic tape 10, and the head-switching point is positioned correctly on the magnetic tape 10. The recorded video signal can accordingly be reproduced by other magnetic recording and reproducing apparatus complying with VHS specifications.

Next, the adjustment procedure will be described in more detail.

Figure 5:
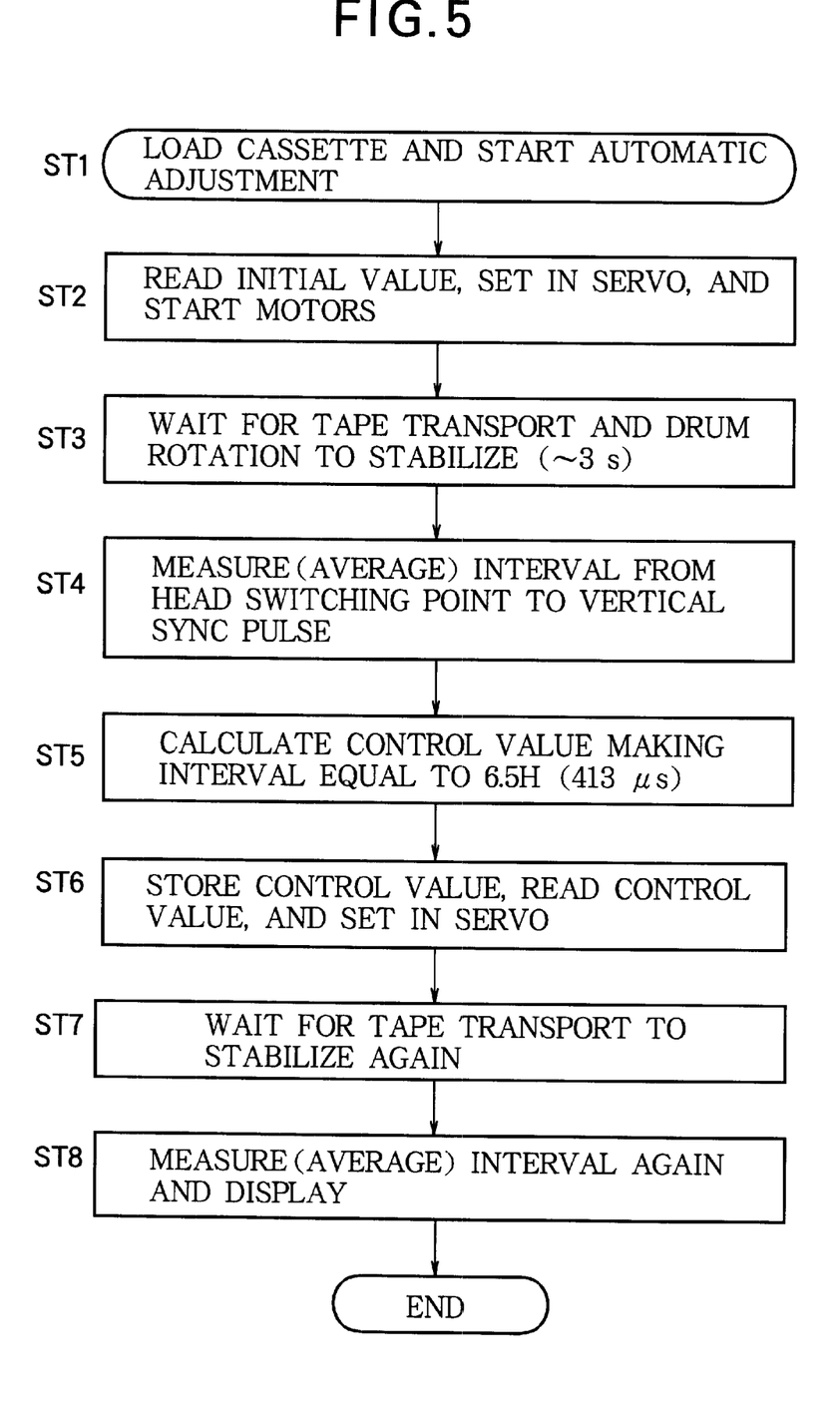
FIG. 5 is a flowchart illustrating the head-switching timing adjustment in the first embodiment.

Referring to FIG. 5, to start the adjustment, the reference cassette is loaded and the microcontroller unit 31 is set to a special adjustment mode, by means of a command signal not shown in the drawings (step ST1). The microcontroller unit 31 reads the initial value from the memory device 33, sets this value in the servo circuit 32, and issues commands that start the drum motor 8a and tape transport motors (step ST2). The servo circuit 32 controls the drum motor 8a according to the initial value set by the microcontroller unit 31.

The microcontroller unit 31 waits approximately three seconds for tape transport and the rotation of the drum 8 to stabilize (step ST3), then begins measuring the interval from the head-switching point, as indicated by a rising or falling transition of the head-switching signal Ss, to the synchronizing (sync) pulse Sv in the vertical synchronizing signal 14 (step ST4). This interval will be referred to below as the Ss-Sv interval. The microcontroller unit 31 measures a plurality of Ss–Sv intervals, takes their average value, compares the average value with the ideal interval of 413 $\mu$s (6.5H), and calculates a control value that will produce the ideal interval (step ST5).

The microcontroller unit 31 stores the calculated control value in the memory device 33, then reads the control value from the memory device 33, verifies that the correct control value has been stored, and sets the control value in the servo circuit 32 (step ST6). The servo circuit 32 now begins controlling the drum motor 8a according to the control value, instead of the initial value. The microcontroller unit 31 waits again for tape transport and drum rotation to stabilize (step ST7), then measures the average Ss–Sv interval once more, and displays the measured value on the display unit 34 (step ST8). The displayed value is, for example, '6.5' or '413,' indicating that the adjustment has been successfully completed. If a different value is displayed, indicating an adjustment error, the adjustment can be repeated.

By starting from an initial value close to the final control value, the first embodiment enables the adjustment to be completed quickly. In particular, the wait in step ST7 is shortened.

By displaying the measured interval at the end of the adjustment, the first embodiment provides confirmation that the adjustment has been successfully completed.

In a variation of the first embodiment, the microcontroller unit 31 has another mode of operation in which it measures and displays the Ss–Sv interval without adjusting the control value. This mode can be used for inspection or troubleshooting.

In another variation, two permanent magnets 20 are mounted at diametrically opposite positions on the rotating drum 8, and the head-switching signal Ss is toggled each time a pulse Sp is received from the position-sensing head 21.

In still another variation, during normal operation, when a video signal is reproduced from the magnetic tape 10, the microcontroller unit 31 measures the Ss–Sv interval and adjusts the control value set in the servo circuit 32 to make the Ss–Sv interval equal to the desired 413 μs (6.5H), but does not write the adjusted control value into the memory device 33.

These variations also apply in the following embodiments.

Figure 6:
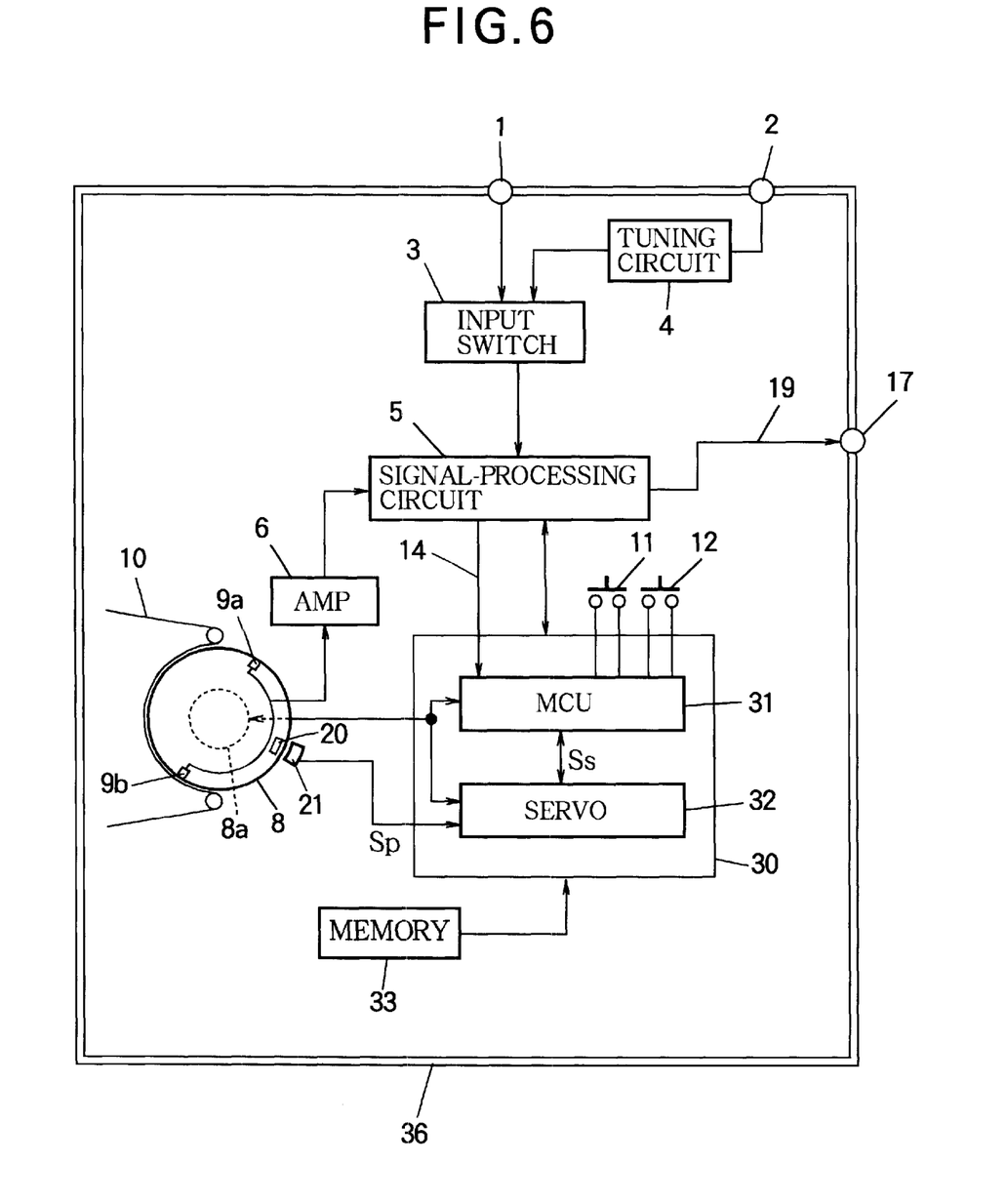
FIG. 6 is a block diagram of a video cassette recorder illustrating second and fourth embodiments of the invention.

The second embodiment is another video cassette recorder that records and reproduces signals according to the NTSC standard. Referring to FIG. 6, the second embodiment has an external input terminal 1, antenna input terminal 2, input switching device 3, tuning circuit 4, signal-processing circuit 5, amplifier circuit 6, rotating drum 8, drum motor 8a, video heads 9a, 9b, record button 11, play button 12, video output terminal 17, permanent magnet 20, position-sensing head 21, control unit 30, and memory device 33 similar to the corresponding elements in the first embodiment. The memory device 33 stores the same initial value as in the first embodiment. In the control unit 30, the servo circuit 32 is identical to the servo circuit in the first embodiment. The microcontroller unit 31 is similar to the microcontroller unit in the first embodiment, but does not have a function for displaying the measured Ss–Sv interval.

The adjustment operation performed in the second embodiment is the same as in the first embodiment through step ST6 in FIG. 5. Steps ST7 and ST8 are omitted. That is, when the control value has been stored in the memory device 33, the adjustment ends; the Ss–Sv interval is not measured again.

Subsequent recording and reproducing operations are the same as in the first embodiment.

By omitting the display unit that was used to display the measured Ss–Sv interval in the first embodiment, the second embodiment reduces the cost of the video cassette recorder.

In a variation of the second embodiment, after the control value has been stored in the memory device 33, the control value is read, confirmed, and set in the servo circuit 32. The microcontroller unit 31 measures the Ss–Sv interval again, and reports the measured value to automatic test equipment electronically, as digital data, for confirmation of successful adjustment. This variation of the second embodiment is suitable for use on automated production lines, in which the adjustment process is carried out without human intervention.

Next, a third embodiment will be described. The third embodiment is a video cassette recorder that records and reproduces signals according to the PAL standard, in which six and one-half horizontal periods is equal to 416 μs.

The third embodiment has the hardware configuration shown in FIG. 4, comprising an external input terminal 1, antenna input terminal 2, input switching device 3, tuning circuit 4, signal-processing circuit 5, amplifier circuit 6, rotating drum 8, drum motor 8a, video heads 9a, 9b, record button 11, play button 12, video output terminal 17, permanent magnet 20, position-sensing head 21, control unit 30, memory device 33, and display unit 34. In the control unit 30, the servo circuit 32 drives the drum motor 8a at a rotational frequency of 25 Hz, which is the PAL frame rate. The memory device 33 stores an initial value that produces an Ss–Sv interval nominally equal to 416 μs, given an ideal permanent magnet 20 mounted in the ideal position in the rotating drum 8.

Figure 7:
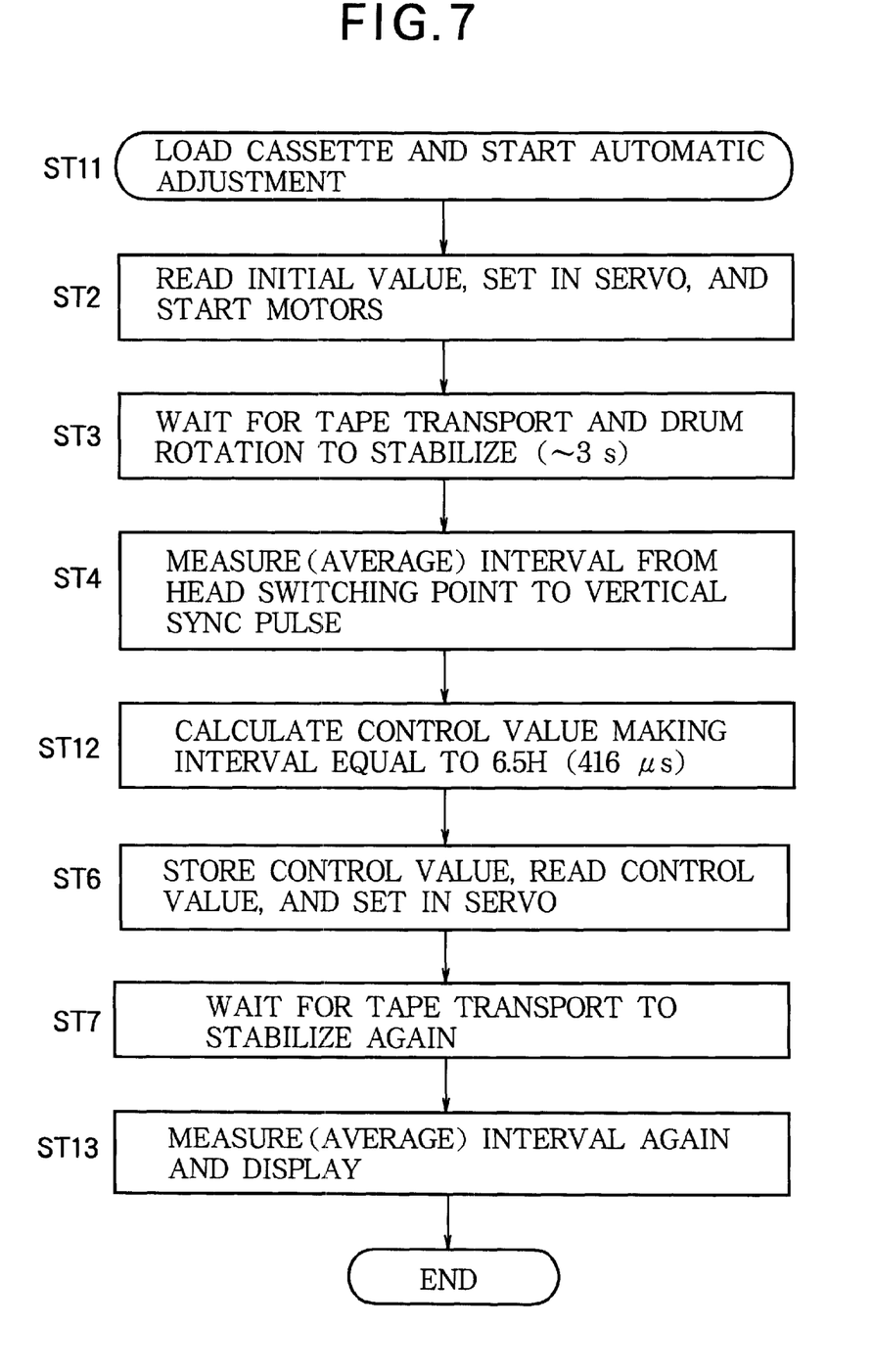
FIG. 7 is a flowchart illustrating the head-switching timing adjustment in the third embodiment.

The adjustment operation performed in the third embodiment is illustrated in FIG. 7. A reference cassette in which a PAL reference video signal is recorded according to VHS specifications is loaded to start the adjustment (step ST11). As in the first embodiment, the microcontroller unit 31 reads the initial value from the memory device 33 and sets it in the servo circuit 32 (step ST2), waits for tape transport and drum rotation to stabilize (step ST3), and measures the Ss–Sv interval (step ST4). The microcontroller unit 31 calculates a control value that will set the Ss–Sv interval to 6.5H, which is now equal to 416 μs (step ST12). The control value is stored in and read from the memory device 33 and set in the servo circuit 32 (step ST6), and the microcontroller unit 31 waits for tape transport and drum rotation to stabilize again (step ST7). The microcontroller unit 31 then measures the Ss–Sv interval again, and displays the measured interval on the display unit 34, the nominal displayed value now being, for example, '6.5' or '416' (step ST13).

In subsequent recording operations, the servo circuit 32 controls the rotational phase of the drum 8 so that the head-switching point occurs 416 μs (6.5H) before the vertical synchronizing pulse Sv in the vertical synchronizing signal 14. Because of the above adjustment of the control value, which controls the position of the heads 9a, 9b at the head-switching instant, both the vertical synchronization signal and the head-switching point are correctly located on the magnetic tape 10.

The control value may also be used in reproducing operations, setting the head-switching point 416 μs (6.5H) before the vertical synchronizing pulse Sv in the vertical synchronizing signal 14 reproduced from a properly recorded magnetic tape of the PAL type.

The third embodiment provides the same effects for a PAL video cassette recorder as the first embodiment provides for an NTSC video cassette recorder.

Next, a fourth embodiment will be described. The fourth embodiment is also a video cassette recorder that records and reproduces signals according to the PAL standard.

The fourth embodiment has the same configuration as the second embodiment, shown in FIG. 6. The memory device 33, however, stores an initial value that produces an Ss–Sv interval nominally equal to 416 μs, for an ideal permanent magnet 20 mounted in the ideal position, and the servo circuit 32 drives the drum motor 8a at a 25-Hz rotational rate.

The adjustment operation performed in the fourth embodiment is the same as in the third embodiment through step ST6 in FIG. 7. the control value being calculated to adjust the measured Ss–Sv interval to 416 μs. Steps ST7 and ST13 in FIG. 7 are omitted.

Subsequent recording and reproducing operations are the same as in the third embodiment. The Ss–Sv interval is 416 μs in both recording and reproducing operations.

The fourth embodiment provides the same effects for a PAL video cassette recorder as the second embodiment provides for an NTSC video cassette recorder.

As in the second embodiment, after the control value has been calculated and stored, the Ss–Sv interval can be measured again for output to automatic test equipment.

Next, a fifth embodiment will be described. The fifth embodiment is a video cassette recorder that operates in both the NTSC and PAL modes.

Figure 8:
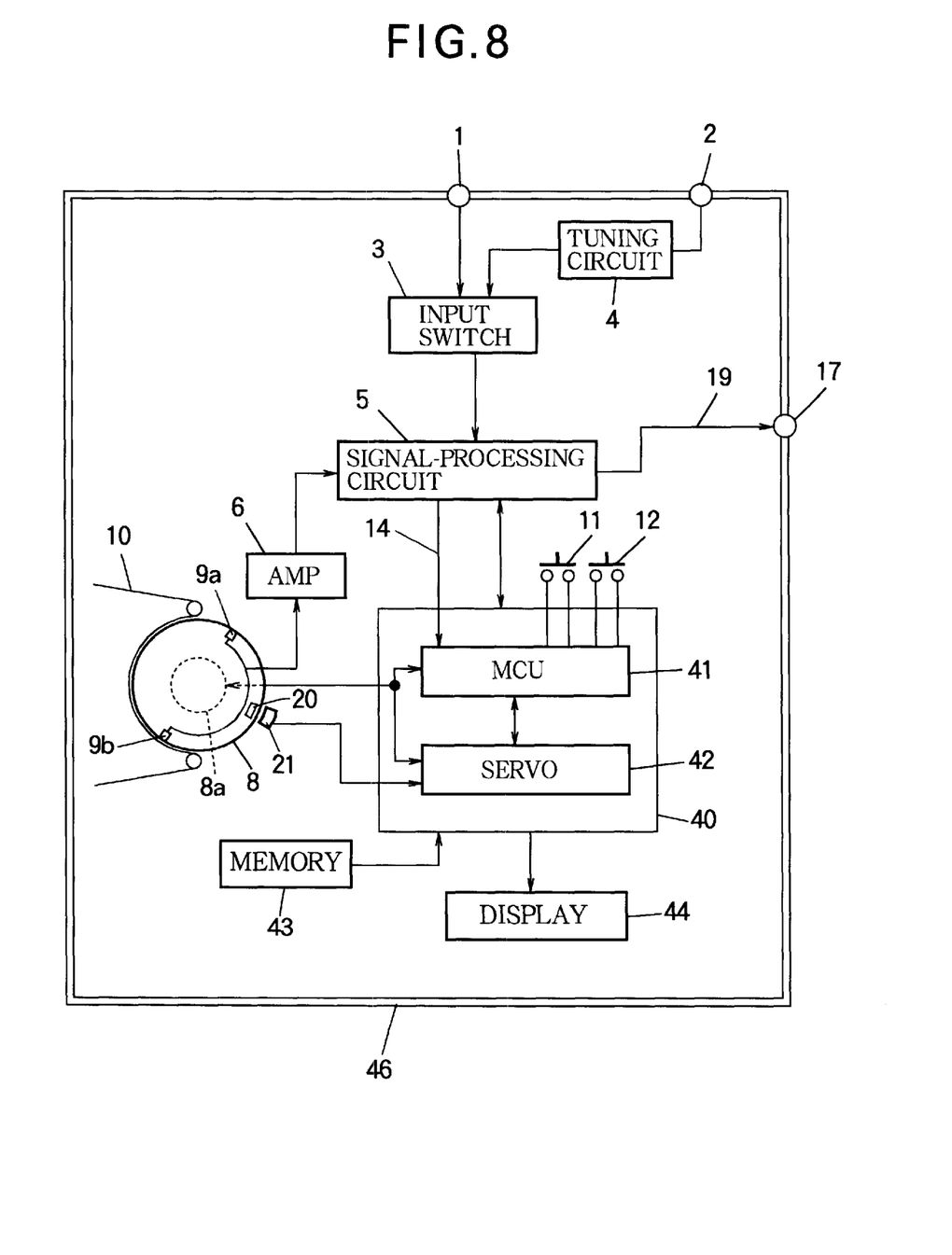
FIG. 8 is a block diagram of a video cassette recorder illustrating a fifth embodiment of the invention.

Referring to FIG. 8, the fifth embodiment has an external input terminal 1, antenna input terminal 2, input switching device 3, tuning circuit 4, signal-processing circuit 5, amplifier circuit 6, rotating drum 8, drum motor 8a, video heads 9a, 9b, record button 11, play button 12, video output terminal 17, permanent magnet 20, and position-sensing head 21 as described in the preceding embodiments.

The control unit 40 of the fifth embodiment comprises a microcontroller unit 41 that is programmed to support operations in both the NTSC and PAL modes, and a servo circuit 42 that is similar to the servo circuit 32 described in the preceding embodiments, but is capable of driving the drum motor 8a at a rotational frequency of either 30 Hz or 25 Hz, as commanded by the microcontroller unit 41.

The fifth embodiment also has a memory device 43, a display unit 44, and a mode selection switch 45. The memory device 43 stores an initial value and a control value for the NTSC mode, and another initial value and control value for the PAL mode. The display unit 44 is similar to the display unit 34 in the first and third embodiments. The mode selection switch 45 is coupled to an input port of the microcontroller unit 41, and generates a signal that selects the NTSC mode or PAL mode.

In the adjustment procedure in the fifth embodiment, first, an NTSC reference cassette is loaded. The mode selection switch 45 is set to the open or 'off' position, for example, to select the NTSC mode. The microcontroller unit 41 reads the initial value for the NTSC mode from the memory device 43, sets this value in the servo circuit 42, and proceeds as described in the first embodiment, measuring the Ss–Sv interval, calculating a control value that will adjust this interval to 413 μs (6.5H), and storing the calculated control value in the memory device 43.

Next the mode selection switch 45 is set to the closed or 'on' position, for example, to select the PAL mode, and a PAL reference cassette is loaded. The microcontroller unit 41 reads the initial value for the PAL mode from the memory device 43, sets this value in the servo circuit 42, and proceeds as described in the third embodiment, measuring the Ss–Sv interval, calculating a control value that will adjust this interval to 416 μs (6.5H), and storing this value in the memory device 43.

Figure 9:
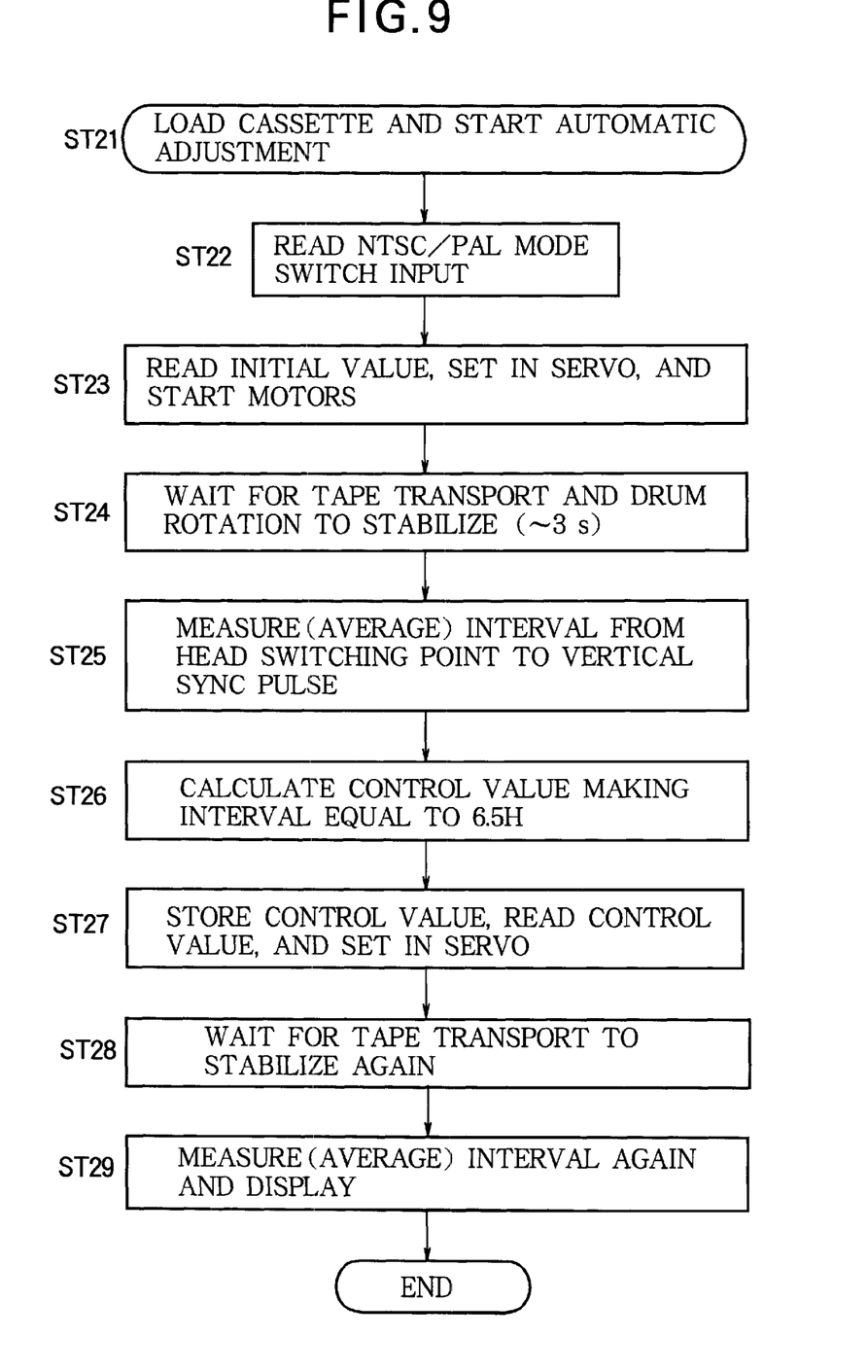
FIG. 9 is a flowchart illustrating the head-switching timing adjustment in the fifth embodiment.

The adjustment procedure is outlined in FIG. 9. After the reference cassette is loaded to start the adjustment (step S21), the microcontroller unit 41 reads the input from the mode selection switch 45 to discriminate between the NTSC and PAL modes (step ST22). The initial value appropriate for the mode selected by the mode selection switch 45 is read from the memory device 43 and set in the servo circuit 42 (step ST23). After waiting for tape transport and drum rotation to stabilize (step ST24). the microcontroller unit 41 measures the average Ss–Sv interval (step ST25) and calculates a control value that will adjust the Ss–Sv interval to six and one-half horizontal periods; that is, to 413 μs in the NTSC mode, or to 416 μs in the PAL mode (step ST26). The calculated value is stored in the memory device 43, read from the memory device 43, and set in the servo circuit 42 (step ST27). After waiting for tape transport and drum rotation to stabilize again (step ST28), the microcontroller unit 41 measures the Ss–Sv interval and displays the measured interval on the display unit 44 (step ST29). This procedure is performed twice, once in the NTSC mode with an NTSC reference cassette, and once in the PAL mode with a PAL reference cassette.

In subsequent recording operations, the microcontroller unit 41 determines whether the signal received from the external input terminal 1 or antenna input terminal 2 is an NTSC signal or PAL signal, by measuring the frame rate, for example; reads the corresponding control value from the memory device 43; and sets this control value in the servo circuit 42. The servo circuit 42 drives the drum motor 8a at 30 Hz for an NTSC signal or 25 HZ for a PAL signal, controlling the rotational phase of the drum 8 according to the control value set by the microcontroller unit 41. The vertical synchronizing pulse Sv is thereby recorded in the correct position on the magnetic tape 10, and the switching point is also correctly positioned.

The control values stored in the memory device 43 may also be used when NTSC and PAL video signals are reproduced from ordinary cassettes.

The fifth embodiment provides the combined effects of the first and third embodiments for a video cassette recorder that supports both the NTSC and PAL modes of operation.

Next, a sixth embodiment will be described. The sixth embodiment is also a video cassette recorder that operates in both the NTSC and PAL modes.

Figure 10:
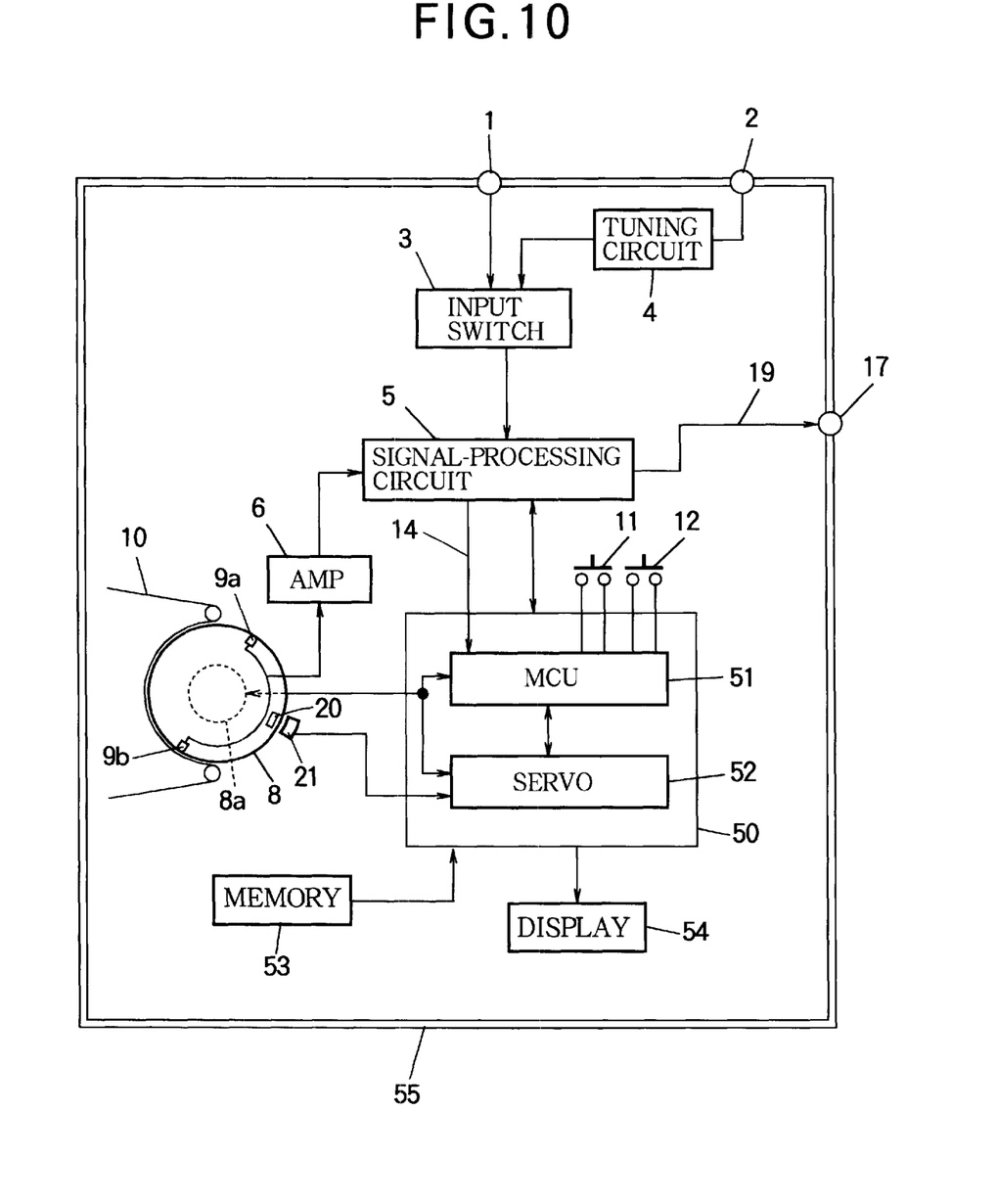
FIG. 10 is a block diagram of a video cassette recorder illustrating sixth and seventh embodiments of the invention.

Referring to FIG. 10, the sixth embodiment has an external input terminal 1, antenna input terminal 2, input switching device 3, tuning circuit 4, signal-processing circuit 5, amplifier circuit 6, rotating drum 8, drum motor 8a, video heads 9a, 9b, record button 11, play button 12, video output terminal 17, permanent magnet 20, and position-sensing head 21 as described in the preceding embodiments.

The control unit 50 of the sixth embodiment includes a microcontroller unit 51 and servo circuit 52 that are generally similar to the corresponding elements in the fifth embodiment, supporting operations in both the NTSC and PAL modes. The microcontroller unit 51, however, is capable of distinguishing between a recorded NTSC signal and a recorded PAL signal on the basis of tape transport speed and the rate at which control pulses are reproduced from a control track (not visible) on the magnetic tape 10. The tape transport speed is determined from the speed of a capstan motor (not visible) that drives the tape.

The sixth embodiment also has a memory device 53 and a display unit 54, which are similar to the corresponding elements in the fifth embodiment.

In the adjustment procedure in the sixth embodiment, first, an NTSC reference cassette is loaded and the play button 12 is pressed. The microcontroller unit 51 automatically recognizes that an NTSC signal is recorded in the cassette, reads the initial value for the NTSC mode from the memory device 53, sets this value in the servo circuit 52, measures the resulting Ss–Sv interval, calculates a control value that will adjust this interval to 413 μs (6.5H), and stores the control value in the memory device 53. After the successful completion of this adjustment has been confirmed from the display unit 54, a PAL reference cassette is loaded and the play button 12 is pressed again. The microcontroller unit 51 automatically recognizes that a PAL signal is recorded in the cassette, reads the initial value for the PAL mode from the memory device 53, sets this value in the servo circuit 52, measures the resulting Ss–Sv interval, calculates a control value that will adjust this interval to 416 μs (6.5H), and stores the control value in the memory device 53.

Figure 11:
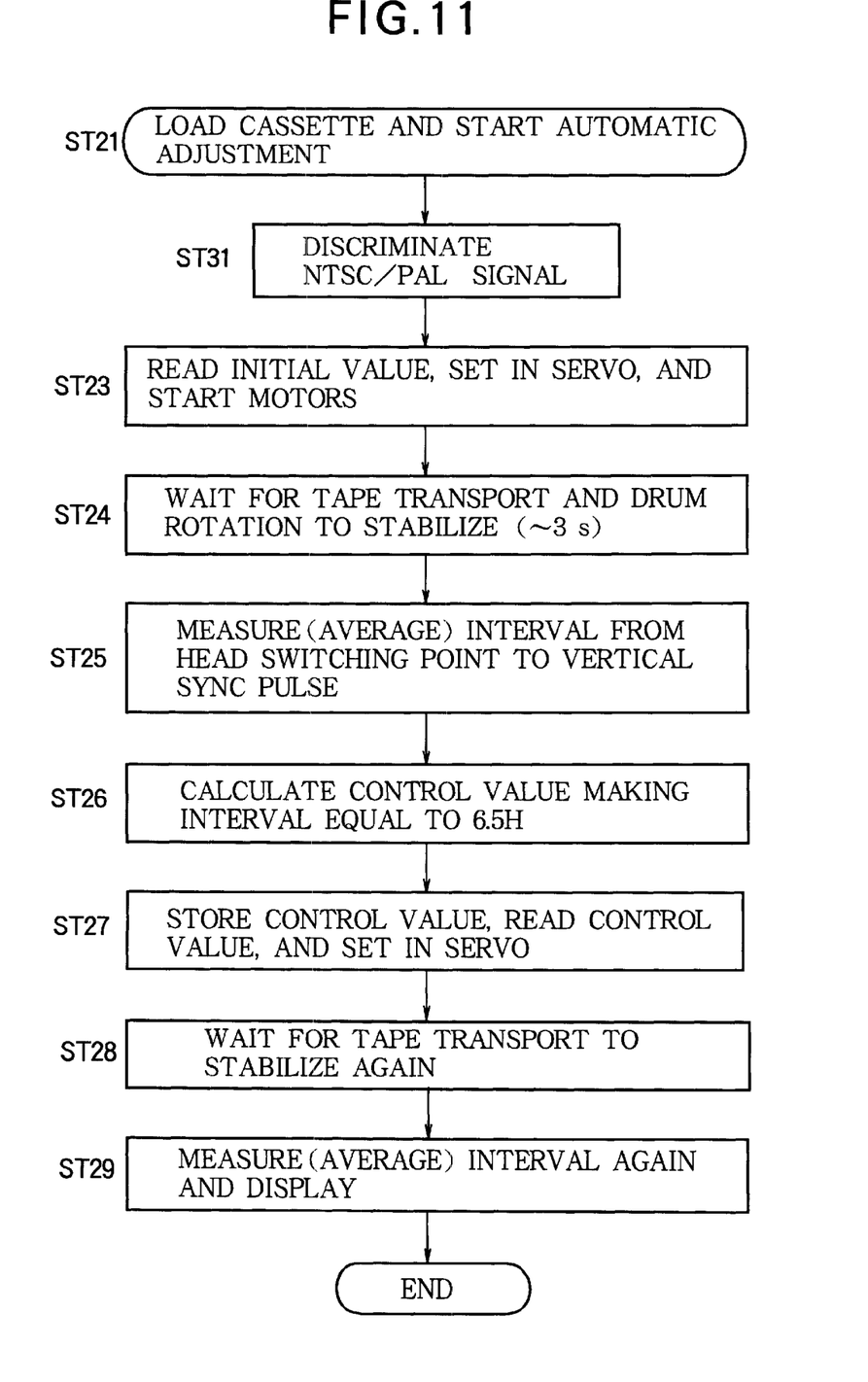
FIG. 11 is a flowchart illustrating the head-switching timing adjustment in the sixth embodiment.

The adjustment procedure is outlined in FIG. 11. After a reference cassette is loaded to start the adjustment (step S21), the microcontroller unit 51 automatically determines whether the signal recorded in the cassette is an NTSC or a PAL signal (step ST31), then proceeds as described in the fifth embodiment, reading the appropriate initial value from the memory device 53 and setting this initial value in the servo circuit 52 (step ST23), waiting for tape transport and drum rotation to stabilize (step ST24), measuring the average Ss–Sv interval (step ST25), calculating a control value that will adjust the Ss–Sv interval to six and one-half horizontal periods (step ST26), storing the control value in the memory device 53, reading the control value back from the memory device 53, and setting the control value in the servo circuit 52 (step ST27), waiting for tape transport and drum rotation to stabilize again (step ST28), measuring the Ss–Sv interval again, and displaying the newly measured interval on the display unit 54 (step ST29). This procedure is performed twice, once with an NTSC reference cassette and once with a PAL reference cassette.

In subsequent recording operations, the microcontroller unit 51 determines whether the signal received from the external input terminal 1 or antenna input terminal 2 is an NTSC signal or PAL signal, reads the corresponding control value from the memory device 53, and sets this control value in the servo circuit 52. The servo circuit 52 drives the drum motor 8a at the appropriate speed, controlling the rotational phase of the drum 8 according to the control value set by the microcontroller unit 51. The vertical synchronizing pulse Sv is thereby recorded in the correct position on the magnetic tape 10, and the switching point is correctly positioned.

The control values stored in the memory device 53 may also be used when NTSC and PAL video signals are reproduced from ordinary cassettes. Here too, the microcontroller unit 51 automatically recognizes whether the video signal recorded in the cassette is an NTSC signal or a PAL signal.

The sixth embodiment provides the same effects as the fifth embodiment, with the additional effect that the person performing the adjustment does not have to set a switch to indicate whether the reference cassette is a PAL cassette or an NTSC cassette. The adjustment process therefore becomes more convenient and reliable than in the fifth embodiment.

In a variation of the sixth embodiment, both NTSC and PAL signals are recorded in the same reference cassette, so that the adjustments for both modes can be completed by loading only a single cassette.

Next, a seventh embodiment will be described. The seventh embodiment has the same configuration as the sixth embodiment, shown in FIG. 10, but differs in the programming of the microcontroller unit 51. The microcontroller unit 51 is programmed to calculate control values for both the NTSC and PAL modes from an Ss–Sv measurement made in just one of the two modes.

In the adjustment procedure in the seventh embodiment, first, a reference cassette of either the NTSC or PAL type is loaded and the play button 12 is pressed. The microcontroller unit 51 automatically recognizes the type of signal recorded in the cassette, reads the corresponding initial value from the memory device 53, sets this value in the servo circuit 52, and measures the resulting Ss–Sv interval. From the difference between the measured Ss–Sv interval and 413 $\mu$s, if the recorded signal is an NTSC signal, or 416 $\mu$s, if the recorded signal is a PAL signal, the microcontroller unit 51 calculates a first control value that will adjust the Ss–Sv interval to 6.5H in the current mode (NTSC or PAL), and stores this first control value in the memory device 53.

Next, the microcontroller unit 51 converts the first control value to a second control value that will adjust the Ss–Sv interval to 6.5H in the other mode (PAL or NTSC). The details of the conversion computation depend on internal details of the servo circuit 52, but basically, to convert from an NTSC control value to a PAL control value, the microcontroller unit 51 multiplies the NTSC control value by a factor of 30/25 to compensate for the different rotational rates of the drum 8, and subtracts three microseconds (3 $\mu$s) to compensate for the different length of six and one-half horizontal periods. To convert from a PAL control value to an NTSC control value, basically, the microcontroller unit 51 multiplies by 25/30 and adds three microseconds. The second control value is also stored in the memory device 53.

After reading both control values from the memory device 53, and confirming that they have been correctly stored, the microcontroller unit 51 sets the control value corresponding to the type of signal in the reference cassette in the servo circuit 52, and measures the Ss–Sv interval again to confirm that the adjustment has been successful.

Figure 12:
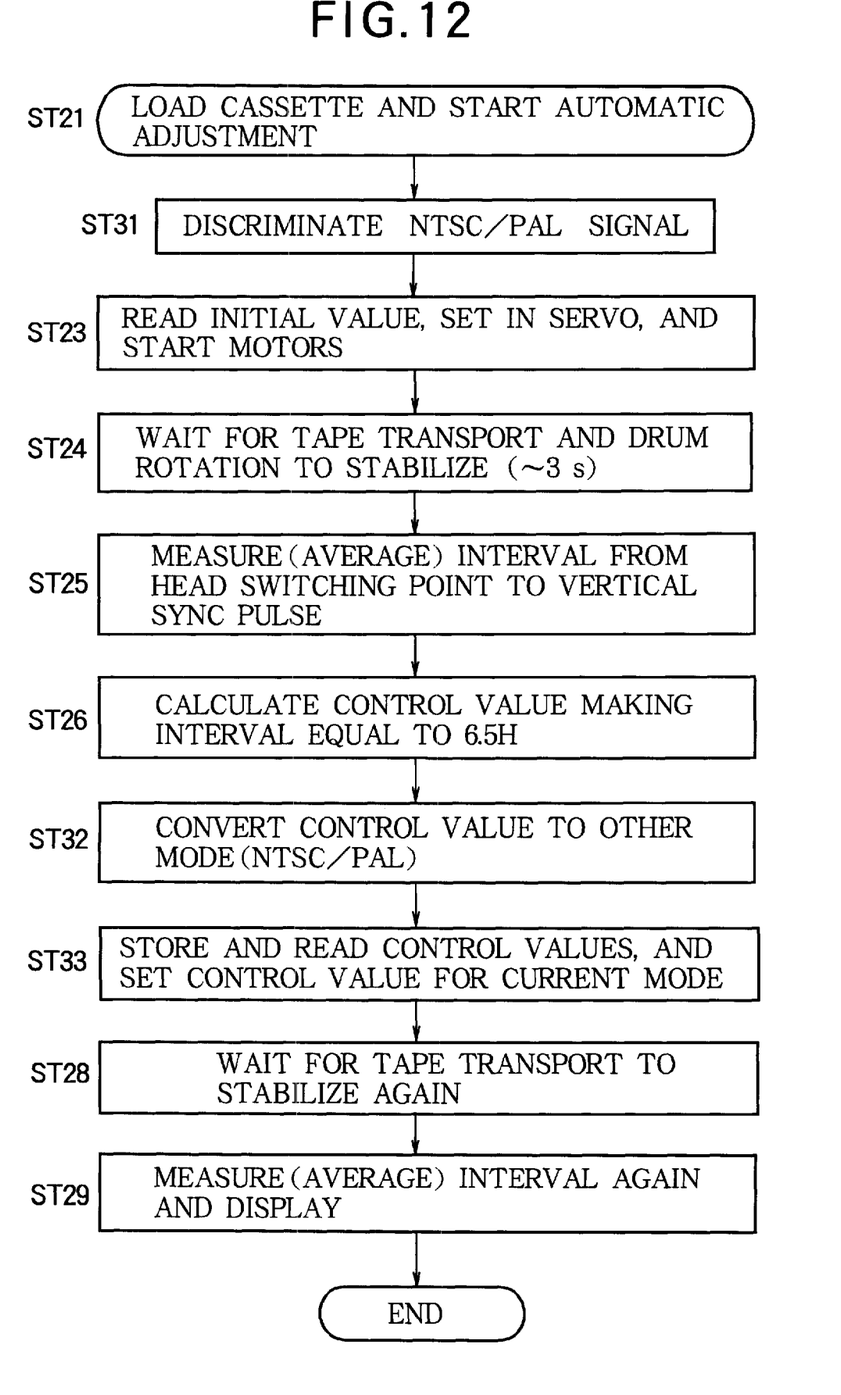
FIG. 12 is a flowchart illustrating the head-switching timing adjustment in the seventh embodiment.

The adjustment procedure is outlined in FIG. 12. After a reference cassette is loaded to start the adjustment (step S21), as in the sixth embodiment, the microcontroller unit 51 automatically determines whether the signal recorded in the cassette is an NTSC or a PAL signal (step ST31), reads the appropriate initial value from the memory device 53 and sets this initial value in the servo circuit 52 (step ST23), waits for tape transport and drum rotation to stabilize (step ST24), measures the average Ss–Sv interval (step ST25), and calculates a control value that will set the Ss–Sv interval to six and one-half horizontal periods in the current mode (step ST26). Next, the microcontroller unit 51 calculates a control value that will set the Ss–Sv interval to six and one-half horizontal periods in the other mode (step ST32). Both control values are stored in the memory device 53 and read from the memory device 53, and the control value corresponding to the current mode is set in the servo circuit 52 (step ST33). The microcontroller unit 51 then waits for tape transport and drum rotation to stabilize again (step ST28), measures the Ss–Sv interval once more, and displays the newly measured Ss–Sv interval on the display unit 54 (step ST29). This procedure need be performed only once. If the display unit 54 indicates '6.5,' for example, the adjustment has been successfully completed.

Subsequent recording and reproducing operations are carried out as in the sixth embodiment.

The seventh embodiment provides the same effects as the sixth embodiment, but further simplifies and shortens the adjustment process by using only a single reference cassette and calculating both NTSC and PAL control values from the same measurement of the Ss–Sv interval.

In a variation of the seventh embodiment, the memory device 53 stores only a single initial value and a single control value. For example, only the NTSC values are stored. When operating in the PAL mode, the microcontroller unit 51 converts the NTSC values to PAL values by the procedure described above.

By providing appropriate initial values, the invention enables the adjustment of the head-switching point to be completed quickly. By providing means for displaying the measured Ss–Sv interval, the invention enables the adjustment to be confirmed easily. By providing different initial values and control values for the NTSC and PAL modes, the invention enables the head-switching point to be adjusted accurately in both modes. In the sixth and seventh embodiments, the adjustment process is further shortened and simplified by automatic discrimination between the NTSC and PAL modes, and automatic conversion of the control value calculated in one mode to a control value for the other mode. In all embodiments, the adjustment is automatic and does not rely on manual manipulation of analog circuit elements.

The adjustment procedures and control values described herein as applying to PAL signals also apply to SECAM signals, which have the same frame rate and horizontal period as PAL signals. Incidentally, SECAM is an abbreviation of Sequentiel Couleur avec Memoire.

The invented adjustment method can be applied not only when the magnetic recording and reproducing apparatus is manufactured, but also when the apparatus is serviced.

The invention has been described in relation to a magnetic recording and reproducing apparatus of the VHS types, but can be applied to other types of magnetic recording and reproducing apparatus, in which the required Ss–Sv interval may differ from 6.5H.

Those skilled in the art will recognize that further variations are possible within the scope claimed below.

What is claimed is:

1. A method of adjusting a head-switching point of a magnetic recording and reproducing apparatus having at least two video heads mounted on a rotating drum, comprising the steps of:

(a) storing an initial value in a memory device;

(b) reproducing a reference video signal, using said initial value to control said head-switching point;

(c) measuring a first interval from said head-switching point to a vertical synchronizing pulse in the reference video signal reproduced using said initial value;

(d) calculating, from the measured interval, a control value that sets said head-switching point a predetermined distance from said vertical synchronizing pulse; and (e) storing the calculated control value in said memory device for future use in recording video signals.

2. The method of claim 1, further comprising the steps of:

(f) reproducing said reference video signal, using said control value;

(g) measuring a second interval from said head-switching point to the vertical synchronizing pulse in the reference video signal reproduced using said control value; and (h) displaying said second interval.

3. The method of claim 1, wherein said reference video signal is an NTSC signal and said initial value is a nominal value for recording and reproducing NTSC signals.

4. The method of claim 1, wherein said reference video signal is a PAL signal and said initial value is a nominal value for recording and reproducing PAL signals.

5. The method of claim 1, wherein said steps (b) to (e) are carried out once using an NTSC reference video signal and once using a PAL reference video signal, thereby producing two control values, both of which are left stored in said memory device.

6. The method of claim 1, further comprising the step of automatically discriminating whether said reference video signal is an NTSC signal or a PAL signal.

7. The method of claim 1, further comprising the step of automatically converting said control value between a first value for use with an NTSC video signal and a second value for use with a PAL video signal.

8. The method of claim 7, further comprising the step of automatically converting said initial value between a third value for use with an NTSC video signal and a fourth value for use with a PAL video signal.

9. A magnetic recording and reproducing apparatus having at least two video heads mounted in a rotating drum, reproducing a reference video signal to adjust a head-switching point of the two video heads, comprising:

a servo circuit receiving a sensor signal indicating an angular position of said rotating drum, and providing a controllable delay from said sensor signal, thereby generating a head-switching signal that determines said head-switching point;

a memory device storing an initial value and a control value; and a control device coupled to said servo circuit and said memory device, reading said initial value from said memory device, setting said initial value in said servo circuit to control said delay, then receiving a vertical synchronizing signal separated from said reference video signal, comparing said vertical synchronizing signal with said head-switching signal, thereby measuring an interval from said head-switching point to said vertical synchronizing signal, calculating, as said control value, a value that, by controlling said delay, sets the interval from said head-switching point to said vertical synchronizing signal to a predetermined value, storing the calculated control value in said memory device, and setting the calculated control value in said servo circuit when video signals are later recorded by the magnetic recording and reproducing apparatus.

10. The magnetic recording and reproducing apparatus of claim 9, further comprising a display unit, wherein after calculating said control value, said control device sets said control value in said servo circuit, measures the interval from said head-switching point to said vertical synchronizing signal again, and displays the again-measured interval on said display unit.

11. The magnetic recording and reproducing apparatus of claim 9, wherein said reference video signal is an NTSC signal, and said initial value is a nominal value for recording and reproducing NTSC signals.

12. The magnetic recording and reproducing apparatus of claim 9, wherein said reference video signal is a PAL signal, and said initial value is a nominal value for recording and reproducing PAL signals.

13. The magnetic recording and reproducing apparatus of claim 9, further comprising a mode selection switch for switching said control device between an NTSC mode and a PAL mode.

14. The magnetic recording and reproducing apparatus of claim 9, wherein said control device automatically determines whether said reference video signal is an NTSC signal or a PAL signal.

15. The magnetic recording and reproducing apparatus of claim 9, wherein said memory device stores, as said initial value and said control value, first values for use in recording and reproducing NTSC signals, and second values for use in recording and reproducing PAL signals.

16. The magnetic recording and reproducing apparatus of claim 9, wherein said control device automatically converts said initial value and said control value between values suitable for recording and reproducing NTSC signals, and values suitable for recording and reproducing PAL signals.

* * * * *